United States Patent Office.

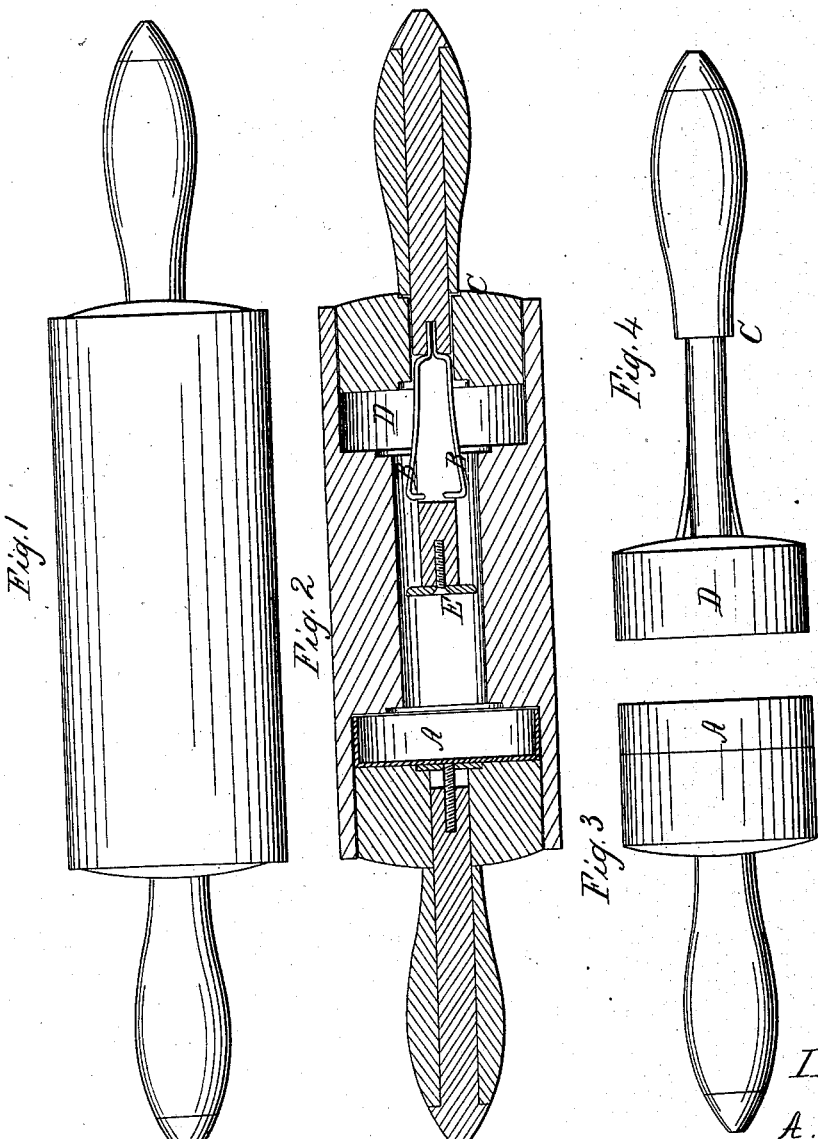

ALBERT J. ROOF, OF PEORIA, ILLINOIS.

Letters Patent No. 78,135, dated May 19, 1868.

---

IMPROVED ROLLING-PIN.

---

*The Schedule referred to in these Letters Patent and making part of the same.*

---

TO ALL WHOM IT MAY CONCERN:

Be it known that I, ALBERT J. ROOF, of Peoria, in the county of Peoria, and State of Illinois, have invented a new and valuable Improvement in Rolling-Pins; and I do hereby declare that the following is a full, clear, and exact description of the construction and operation of the same, reference being had to the annexed drawings, making a part of this specification, and to the letters and figures of reference marked thereon.

The nature of my invention consists in combining, with a rolling-pin, a cake-cutter and vegetable-masher.

Figure 1 of the drawings is an exterior view of my rolling-pin.

Figure 2 is a sectional view thereof, drawn longitudinally.

Figure 3 is a view of my cake-cutter, and

Figure 4 represents my vegetable-masher.

My rolling-pin is made hollow at the centre, as represented on fig. 2, with the hollow enlarged at each end, as shown, and fitted to receive and hold the cake-cutter and vegetable-masher respectively, the handles of which become the handles of the rolling-pin.

Letter A is a representation of the tin part of my cake-cutter firmly attached to the block thereof.

Letters B are wire springs, adjusted, as shown on fig. 2, to inner portion of my vegetable-masher. By pressing these springs against the stem of the masher, the said stem is permitted to pass inward until the shoulder C rests against the block D, thereby allowing the handle of the masher to assume the position shown on fig. 1.

Letter E is a cap over the inner end of the stem of the masher, secured by a screw, as shown, the office of which is to hold the block D in its proper place on one side, while the shoulder-ends of the springs B hold it on the other, when the handle is drawn out and the masher is in use.

The handles of my cake-cutter and vegetable-masher respectively are formed and shaped like handles to an ordinary rolling-pin, except that the handle to the cake-cutter is usually made in two parts, the outer one of which is a hollow cylinder, that revolves around the inner part or stem. I sometimes, also, form the handle of the vegetable-masher in the same manner; but inasmuch as said last-mentioned handle is allowed to rotate inside the block D, the handle serves a good purpose when made in one piece only.

What I claim as my invention, and desire to secure by Letters Patent, is—

A rolling-pin, constructed in the form herein shown, and having combined therewith, in the manner described, a cake-cutter and vegetable-masher, the latter working with the springs B, substantially as specified.

ALBERT J. ROOF.

Witnesses:
GEO. PUTERBAUGH,
J. F. POTTS.